United States Patent [19]

Freud et al.

[11] Patent Number: 4,599,906
[45] Date of Patent: Jul. 15, 1986

[54] REMOTE PROBE DIFFERENTIAL PRESSURE TRANSDUCER

[75] Inventors: Paul J. Freud, Furlong; Paul M. Kroninger, Jr., Harleysville, both of Pa.

[73] Assignee: General Signal Corporation, Stamford, Conn.

[21] Appl. No.: 666,843

[22] Filed: Oct. 31, 1984

[51] Int. Cl.[4] .......................... G01F 1/385; G01L 9/12
[52] U.S. Cl. ..................... 73/861.47; 73/706; 73/708; 73/718; 73/861.52
[58] Field of Search ........... 73/861.47, 861.48, 861.44, 73/706, 756, 707, 718, 708, 861.52, 861.63

[56] References Cited

U.S. PATENT DOCUMENTS 3,939,708  2/1976  Greer et al. .................. 73/861.47
3,956,937  5/1976  Lawford et al. .................. 73/706

Primary Examiner—Donald O. Woodiel
Attorney, Agent, or Firm—William G. Miller, Jr.; Harold Huberfeld

[57] ABSTRACT

A differential pressure transducer assembly for measuring flow in dirty and solids bearing fluids utilizes small barrier diaphragms located at the pressure taps of a flow measuring restriction. The barrier diaphragms are of minimum size and minimum thickness with a minimum volumetric compliance and are connected to a pressure receiving body by equal length capillaries of minimum i.d. A measuring transducer with a diaphragm having low volumetric displacement for measured differential pressures and having minimum volume diaphragm cavities is connected to the capillaries by equal and minimum volume cavities in the pressure receiving body. The pressure receiving body cavities on both the high pressure side and the low pressure side incorporate close tolerance inserts of material having a low thermal expansion coefficient when compared to that of the pressure receiving body, so that with increases in temperature the volumes of the cavities, which are minimized as much as possible, will increase just enough to match the increase in volume of the fill fluid which fills the cavities and capillaries.

8 Claims, 2 Drawing Figures

REMOTE PROBE DIFFERENTIAL PRESSURE TRANSDUCER

BACKGROUND OF THE INVENTION

The present invention relates to a pressure transducer assembly for measuring differential pressures across a restriction in a pipe carrying process fluids. More particularly, this invention relates to a transducer assembly for making such measurements in small pipes carrying fluids which present special problems because of their tendency to clog up small diameter tubing of the type usually used to connect to the pressure taps of such pipes. In particular, such problems arise with dirty fluids, those which contain solids, and those which are highly viscous. Examples of applications where such problems occur include measuring the flow of wastewater, pulp stock, and light slurries.

The usual pressure transducer assembly used for measuring pressure differentials in process piping has a pressure receiving body which encloses a measuring transducer and is connected by way of small bore tubing to pressure taps on the pipe. A fill fluid having a low temperature coefficient and little compressibility is used in the passages and cavities of the pressure receiving body and transducer. Typically, the process fluid is isolated from the fill fluid by large barrier diaphragms. These diaphragms deflect in response to the pressure transmitted through the process fluid which fills the small bore tubing, and the fill fluid on the other side of the barrier diaphragms transmits the pressure changes through passages in the pressure receiving body to the measuring transducer.

The measuring transducers may be of several different types, such as a capacitive type, where the diaphragm forms one plate of a differential capacitor; or the strain gauge type, where the diaphragm incorporates or connects with a strain gauge so that the strain resulting from the diaphragm deflection is a measure of the pressure difference across the diaphragm. Typically, the diaphragms may be made of different materials such as stainless steel, single crystal silicon, etc.

When it is desired to measure the pressure differential across a flow restriction in piping for process fluids containing solids, or those which are very viscous, the small bore tubing will tend to clog and thus prevent trouble free measurement.

It is an object of this invention to provide a differential pressure measuring assembly which will make possible flow measurements of dirty fluids, those with solids, and those of high viscosity, particularly in small diameter process pipes, in low range applications, and where temperature compensation is necessary to obtain the desired accuracy.

SUMMARY OF THE INVENTION

There is provided a differential pressure transducer assembly for measuring pressure differentials across a restriction in a pipe carrying a flowing fluid of the type which tends to clog small diameter tubing. This assembly includes two probes for insertion into the pipe at the points required to detect a differential pressure. The inserted ends of these probes are covered by barrier diaphragms for isolating the flowing fluid in the pipe from the fill fluid behind the barrier diaphragms. A pair of capillary tubes, also containing fill fluid, connect the respective probes to a differential pressure measuring transducer of the type whose diaphragm has low volumetric displacement over its full differential pressure range. Where low ranges are needed and temperature compensation is important these assemblies must have the volume of the fill fluid on both sides of the diaphragm equalized and minimized. In addition, the volume of the capillary tubes must be minimized and the barrier diaphragms must be alike in their diameter and thickness so that they both have the same volumetric compliance. Furthermore, there must be a compensation for the expansion of the fill fluid with increases in temperature. This compensation incorporates the use of inserts in the pressure receiving body of the transducer assembly, with the inserts being of material which has a lower thermal coefficient of expansion than that of the body, The volume of the cavities in which the inserts are placed is designed to accommodate a change in the volume of the fill fluid which closely matches the change expected due to the temperature change.

DESCRIPTION OF THE PREFERRED EMBODIMENT

Figure 1:
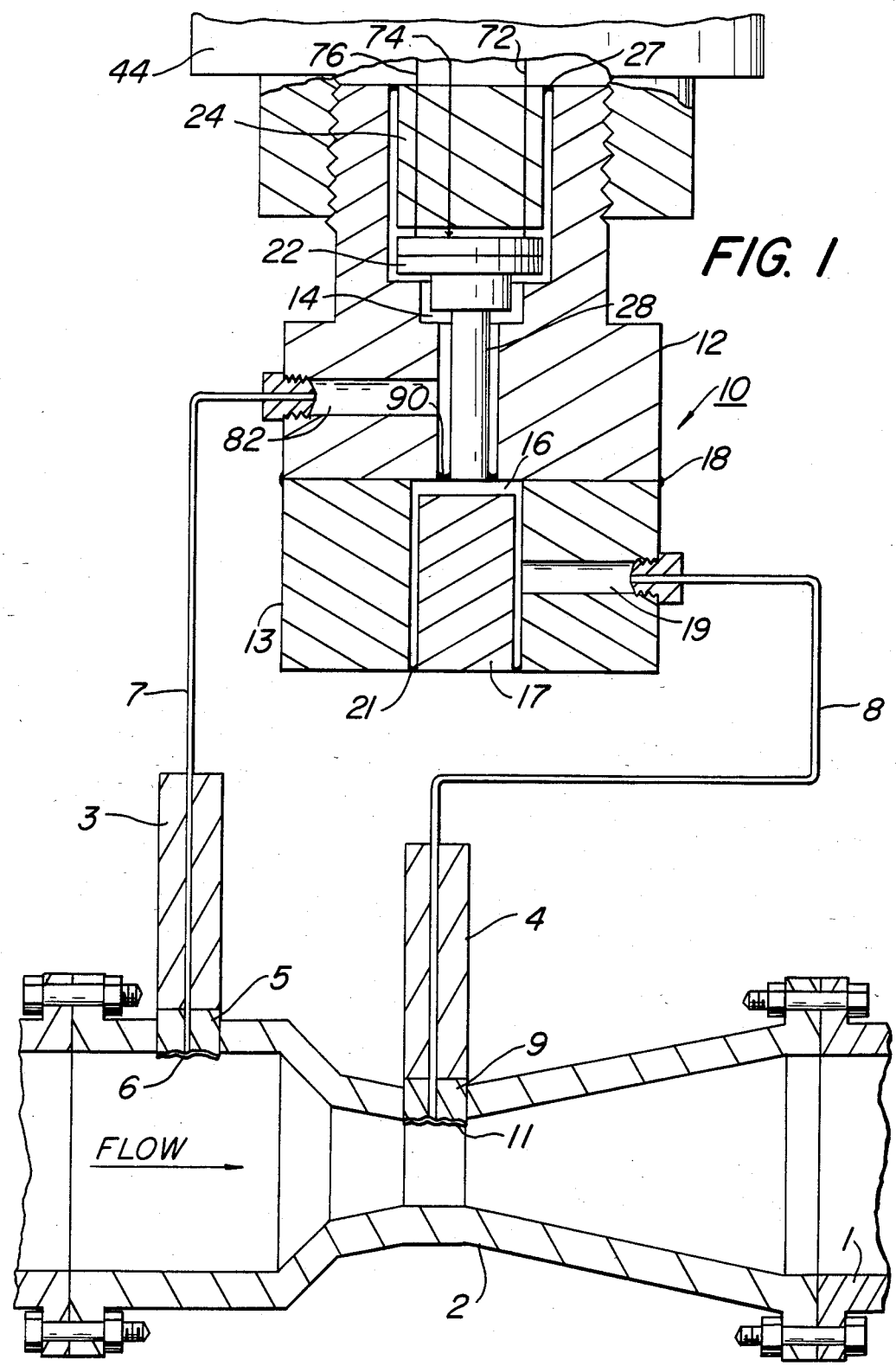
FIG. 1 is a diagram partially in cross section showing the present invention.

FIG. 1 shows a transducer assembly for measuring pressure differential in a pipe 1 when that pipe is carrying a fluid which may present a problem with clogging. The pipe 1 will normally have a venturi, such as venturi 2, which will create a pressure drop between the locations shown for the probes 3 and 4. These probes each have an open ended cavity at the end of their body. These cavities are closed off with barrier diaphragms to isolate the flowing fluid from the other parts of the measuring assembly and particularly from the fill fluid, which is used to fill the cavities of the probes and all other cavities and channels of the assembly. In probe 3, for example, the end which is inserted into the pipe 1 has an end element 5, which has a convoluted surface facing the pipe. This surface has an overall concavity so that there is formed a cavity between the taut barrier diaphragm 6, which overlays the end element, and the convoluted surface of the end element itself. As shown, the barrier diaphragm has matching convolutions so as to minimize the volume of the probe cavity and enhance the compliance of the diaphragm. The cavity also has a central aperture, which is connected to a capillary tube 7 so that any change in pressure on the barrier diaphragm is transmitted through the fill fluid in the capillary. The end portion 9 and barrier diaphragm 11 are similarly related in probe 4.

The capillaries 7 and 8 are connected to a pressure receiving body 10, which has a first pressure receiving section 12 connected to the high pressure capillary 7 and a second pressure receiving section 13 connected to the low pressure capillary 8.

The high pressure section 12 has a channel 82, which connects the capillary 7 to a body cavity 14, shown containing the capacitive type silicon diaphragm transducer 22, its stub 26 and mounting tube 28. The tube 28 is welded at 90 to close off an opening in the high pressure section 12 and to provide support for the transducer 22 in a way which will tend to isolate the transducer from mechanical stress. The tube 28 is a hollow tube which provides communication to one side of the diaphragm of transducer 22 for the pressure of the fill fluid in the low pressure cavity 16, as established by transmission through the capillary 8. The transducer 22 also has an aperture in its top plate for exposing to the other side of the silicon diaphragm to the high pressure signal represented by the pressure of the fill fluid in the cavity 14 as transmitted from the barrier diaphragm 6 by capillary 7.

The low pressure section 13 is shown as being welded to the high pressure section 12 by the weld 18 to form the body 10. The body 10 is shown having a bonnet 44 mounted thereto by threads. The space under the bonnet is utilized to house the electronics usually associated with transducers of this type.

The connection of the capacitive type transducer 22 to the electronics is by way of the contacts 72, 74, and 76 which pass through the feedthrough body shown as insert 24. The feedthrough body 24 is welded at 27 to close off another opening in the cavity of the high pressure section. The feedthrough body also serves another purpose in the cavity 14 in that it provides temperature compensation in a manner which will be describe subsequently. It should be noted that the feedthrough body 24 is a close tolerance fit with the walls of the high pressure section cavity.

Referring now to the low pressure section 13 of the body 10, it will be noted that the capillary 8 is connected to a channel 19, which is connected in turn to the low pressure body cavity 16. This cavity contains an insert 17 which is a close tolerance fit to the walls of the cavity 16 and which is welded at 21 to close of an opening in the cavity 16. The insert 17 serves to provide temperature compensation in the same manner as does insert 24, as will be explained subsequently.

Figure 2:
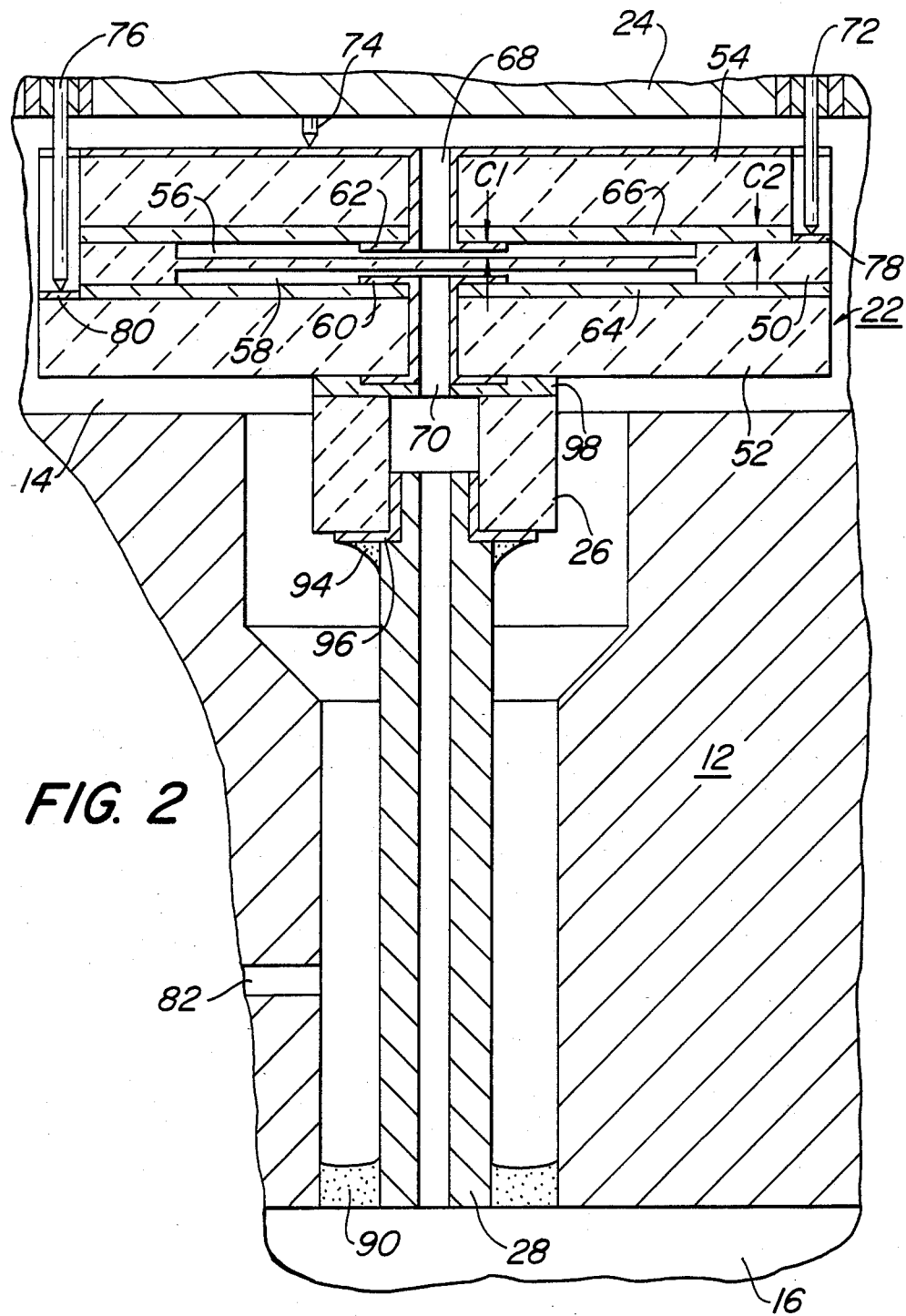
FIG. 2 is a diagram in cross section showing the silicon diaphragm capacitive type of pressure transducer which can be used in the novel assembly of this invention.

FIG. 2 shows in cross section the details of a capacitive type differential pressure transducer of a type which is suited for use in the transducer assembly of the present invention. Also shown is the transducer mounting, as well as the manner in which they both fit into the pressure receiving body 10.

The transducer 22 has a silicon diaphragm 50, which has a circular recess etched into its opposite faces to thereby form the deflecting section of the diaphragm. The diaphragm, being of highly doped silicon, is a conductor and also forms one electrode of the transducer. Parallel silicon support plates 52 and 54 are anodically bonded to the opposite sides of the diaphragm along its periphery to thereby form diaphragm cavities 56 and 58. The anodic bonding requires the use of a nonconductor, such as borosilicate glass, between the parts to be bonded. The glass will also serve to electrically isolate the diaphragm from the fixed electrodes of the transducer. These fixed electrodes are shown as deposited thin films of metal 60 and 62, which are laid down on the borosilicate glass layers 64 and 66, respectively.

Each of the support plates has a pressure communicating passage through it. These are shown in FIG. 2 as 68 and 70. These passages are coated with a thin film of metal, as is the entire top of plate 54 and a part of the bottom of plate 52 as well as contact pad areas 78 and 80. These metal deposits provide the conductive pads for connecting to the fixed plates 60 and 62 as well as diaphragm 50.

Electrical contact between a circuit board and its associated electronics and the plates of the transducer 22 is by way of the spring contacts 72, 74, and 76, respectively. Contacts 72 and 76 make contact through the conducting pads 78 and 80, which are deposited on the diaphragm and the lower plate, respectively, in the sections of the transducer shown broken away for that purpose.

The transducer 22 is spaced from the body 12. By virtue of passages provided by these spaces, the outside surfaces of the transducer and the high pressure aperture 68 are subjected to the pressures in the capillary 7, of FIG. 1. The cavity 16 of the low pressure receiving section and hence the low pressure capillary 8 are connected to the aperture 70 by way of a passage through the Kovar alloy tube 28 and the silicon stub 26. It should be noted that, since the lower support plate 52 is spaced from the body 12, the only firm connection between the transducer and the body 12 is provided by the weld 90. That weld firmly affixes the tube 28 to the body 12. The top end of the tube 28 has a reduced diameter, which fits inside the hole in silicon stub 26 and is affixed at the joint 94; as by either soldering, brazing or by the use of epoxy, for example. To accommodate soldering or brazing, the silicon stub shown is provided with a metal film on its lower surface and its interior. The stub 26 is anodically bonded to the lower support plate 52 by way of an interposed thin borosilicate glass layer 98 between the stub and the plate.

In the remote probe arrangement of the present invention, the thermal expansion of the internal fill fluid, which is enclosed on each side of the transducer diaphragm by the transducer plate, the body cavity, the capillary, and the probe cavity and barrier diaphragm, must be accommodated by an expansion of the internal volume of the system. The most flexible part of the system is the barrier diaphragm, which therefore deflects out to provide for the thermal expansion of the internal fill fluid with a temperature increase. Since the barrier has a finite compliance, a pressure is generated in the internal fill fluid as a result of this fluid expansion and the outward deflection of the barrier diaphragm. It is important in all practical applications of this invention to minimize the magnitude of this expansion pressure and insure that it is small compared with the differential pressure being measured.

To so minimize the expansion pressure, it is important to make the barrier diaphragms as compliant as possible. This means that the barrier diaphragms should be as large in diameter as possible and as thin as possible. both of these dimensions, of course, have practical limitations. It would be difficult to use diameters larger than ¾ inches, if the probe is to be used in pipes carrying process fluids, for the probe should be small compared with the pipe. Also, barrier diaphragm materials can't be made much thinner than a thousandth of an inch and still be rugged enough and capable of being handled.

To further minimize the expansion pressure, it is also important to minimize the internal fill fluid volume and thus minimize the amount of fluid expansion which has to be accommodated. Such a low internal volume allows the present invention to successfully operate at low differential pressure levels, such as with a full scale span of 1 psi. At such low levels, it is important that there be very little shift in the zero due to thermal expansion of the fill fluid, otherwise the accuracy of the measurement will not be sufficient for most applications.

In the design of FIG. 1, the fill fluid volume is minimized by minimizing all of the internal volumes. One such volume is the internal volume behind the barrier diaphragms. This is minimized by forming the diaphragms to the same shape as the back surface of the probe cavity. The diaphragm is given a convoluted shape to enhance compliance, and so the same shape is given to the back surface, to thereby minimize the internal volume.

Another volume which is minimized is that of the capillary tubes. To this end capillaries with an inside diameter of less than ten thousandths of an inch are used. The lower limit on capillary diameter is determined by the conductance of the capillary and the response time required. The conductance is proportional to the fourth power of the diameter, the inverse of the length of the capillary, and the inverse of the viscosity of the fill fluid. The response time is then a function of the pressure difference to be measured, the conductance of the capillaries, and the amount of volume change required, as determined by the deflection of the transducer diaphragm in response to that pressure difference.

Other fluid volumes to be minimized include that of the cavities and passageways of the pressure receiving body and the most important volume to be minimized is that of the transducer itself. In this connection the silicon diaphragm transducer allows this volume to be very small so that the use of the remote probes of this invention is practical, for without a small internal volume in the transducer the capillary volume would have to be larger to provide the desired response times. This results from the fact that the time constant of the response is proportional to the volume transported through the capillaries. The time constant is also inversely proportional to pressure difference and the tube conductance. In transducers, such as shown in FIG. 2, the transducer cavity may typically be 0.4 inches in diameter and 0.0006 inches deep, and on full scale deflection there may be a 20 micro cubic inch volume change. This is the volume change which has to be transported through the capillaries. In contrast, a beam strain gauge transducer may require a volume change of 10,000 micro cubic inches, a factor of 500 higher than with the silicon pressure transducer; and therefore, requiring 500 times the tube conductance or 500 times the pressure difference to get equal response times.

The internal volume for each side of the typical remote probe transducer assembly, as shown in the figures, includes the following components; 4500 micro cubic inches around the transducer, 1400 micro cubic inches in the cavity behind the barrier diaphragm, 2800 micro cubic inches in a 36 inch long, 0.010 inch i.d. capillary, and 800 micro cubic inches in the connecting channeling addressing the transducer. The total volume is thus 9600 micro cubic inches (0.15 cc), which expands 9.6 micro cubic inches per degree centigrade if a silicone fill fluid is used. That volume must be accommodated by the deflection of the barrier diaphragm. A typical stainless steel barrier diaphragm would be 0.75 inches in diameter and 0.001 inches thick and would have a volume compliance of 4000 micro cubic inches per psi. The thermal expansion would therefore generate 0.0025 psi/deg.C. This amount of expansion places a limitation on how low a pressure range the cell can measure and how well the cell can be compensated for this temperature generated pressure. For instance, if the cell were of a 1 psi range the coefficient would amount to a 0.25 %/deg.C. shift.

Again, by way of contrast, the internal volume of a beam strain gauge transducer assembly would have volumes on the order of 0.1 cubic inches, a factor of 25 higher than the volumes obtainable in the present assembly. This means that the pressure range of a typical beam strain gauge transducer assembly would have to be 25 times higher than that of a silicon diaphragm transducer assembly to have an equivalent temperature coefficient.

Since the transducer assembly of the figures measures differential pressure, an approximately equal pressure will be be generated on opposite sides of the transducer diaphragm by the expansion of the fluid and deflection of the barrier diaphragms, and the net effect will be the difference between the two pressures, seen at the transducer as a zero shift with temperature. This apparent zero shift may be minimized by balancing the two expansion pressures. This is accomplished by balancing the internal volumes and the barrier diaphragm compliances on the opposing sides. In practice, with reasonable tolerances for the parts, it is possible to balance the opposing expansion pressures to about plus or minus 10%. The net zero temperature coefficient will be approximately 0.1 times the coefficient of one side.

A further refinement is added to reduce the zero coefficient. Inserts 17 and 24, which are of a low expansion coefficient material such as Kovar (Fe-Ni-Co) or Invar (Fe-Ni) alloy, are incorporated in each side of the cell. As the cell, typically stainless steel, expands with increased temperature the insert expands less, due to its low expansion coefficient. This creates an increasing internal volume. If this volume is matched to the volume that the fill fluid expands, then there will be no net movement of the barrier diaphragms and hence no net pressure change generated in the fill fluid to cause a zero shift. These inserts are of a volume determined by the fill fluid volume, its thermal expansion, and the difference in thermal expansion between the Kovar or Invar and stainless steel, for example.

What is claimed is:

1. A differential pressure transducer assembly for measuring pressure differentials across a restriction in a pipe carrying a flowing fluid, comprising:

first and second probes each of which has an insertable end designed for insertion into said pipe at different points as required to detect a differential pressure therebetween, said insertion ends of said probes each having
an open ended cavity containing a fill fluid, and
barrier diaphragms mounted to close off the open ends of the cavities exposed to said flowing fluid for isolating the flowing fluid in the pipe from the fill fluid;

a pair of capillary tubes containing fill fluid connected to the respective cavities of said probes;

a pressure receiving body having first and second pressure receiving sections each having a cavity containing fill fluid, said cavities each being connected by one of said connecting tubes to the cavity of one of said probes; and a capacitive type differential pressure measuring transducer having a silicon diaphragm sandwiched and bonded between two support plates to form cavities on opposite sides of said diaphragm, said transducer having said diaphragm cavities connected to said body cavities for communication through said fill fluid so that said diaphragm will deflect in response to the differences in pressure exerted by the flowing fluid on the barrier diaphragms.

2. A pressure transducer assembly as set forth in claim 1 in which
   said diaphragm is made of single crystal silicon by etching shallow recesses on both sides to thereby form said diaphragm cavities with a minimum volume as needed to provide the spacing required to accommodate the deflection necessary to provide the desired range of pressure difference, said diaphragm also serving as one electrode of a capacitive type transducer, and
   support plates bonded to opposite sides of said diaphragm along the periphery of said deflecting region, said plates carrying other electrode surfaces which oppose and face opposite sides of the deflecting region and are spaced therefrom.

3. A differential pressure transducer assembly for measuring low range pressure differentials with a minimum shift of zero under changing temperature conditions where the measurement is to be made across a restriction in a pipe carrying a flowing fluid which contains solids, is dirty or highly viscous comprising:
   first and second probes each of which has an insertable end designed for insertion into said pipe at different points as required to detect a differential pressure therebetween, said insertion ends of said probes each having
      a cavity of substantially the same volume containing a fill fluid, and
      identical barrier diaphragms of minimum but equal thickness mounted at that end of the cavities to be inserted into said flowing fluid for isolating the flowing fluid in the pipe from the fill fluid;
   two substantially identical capillary tubes containing fill fluid and connected to the respective cavities of said probes;
   a pressure receiving body having first and second pressure receiving sections each having a cavity containing fill fluid, said cavities each being connected by way of said fill fluid to the fill fluid in the cavity of one of said probes by way of the fill fluid in said capillary tubes, said body cavities each being filled by an insert which fits its cavity to close tolerance so as to minimize the volume of fill fluid in said cavities, said inserts being of a material which has a thermal coefficient of expansion which is lower than that of said body and said inserts also being of a volume such that the volumes of fill fluid in said body cavities is substantially equal and such that a change in volume of the fill fluid in each of the body cavities due to temperature changes of the body and the inserts is substantially equal to the change in volume of the fill fluid for such a temperature change without a change in fill fluid pressure; and
   a differential pressure measuring transducer having a diaphragm sandwiched and bonded between two support plates to form on opposite sides of said diaphragm cavities of minimum and substantially equal volumes containing fill fluid, said transducer being placed so that opposite diaphragm cavities communicate through a minimum volume of fill fluid with corresponding body cavities so that said diaphragm will deflect in response to the differences in pressure exerted by the flowing fluid on the barrier diaphragms.

4. A pressure transducer assembly as set forth in claim 3 in which
   said diaphragm is made of silicon.

5. A pressure transducer assembly as set forth in claim 3 in which
   said transducer is a capacitive type, and
   said diaphragm is made of silicon.

6. A pressure transducer assembly as set forth in claim 3 in which
   said diaphragm is made of single crystal silicon by etching shallow recesses on both sides to thereby form said diaphragm cavities with a minimum volume as needed to provide the spacing required to accommodate the deflection necessary to provide the desired range of pressure difference, said diaphragm also serving as one electrode of a capacitive type transducer, and
   support plates bonded to opposite sides of said diaphragm along the periphery of said deflecting region, said plates carrying other electrode surfaces which oppose and face opposite sides of the deflecting region and are spaced therefrom.

7. A differential pressure transducer assembly for measuring pressure differentials in a process fluid, comprising:
   first and second probes each of which has an insertable end designed for insertion into said process fluid at different points as required to detect the differential pressure to be measured, said insertion ends of said probes each having a cavity containing a fill fluid closed off by a barrier diaphragm so as to isolate the process fluid from the fill fluid with the volumetric compliance of the barrier diaphragms being substantially the same;
   a differential pressure measuring transducer having a diaphragm, with low volumetric displacement at the measured differential pressures, sandwiched between two support plates to form cavities on opposite sides of said diaphragm, said diaphragm cavities containing fill fluid with volume of said fill fluid on both sides of the transducer diaphragm being minimized and equalized;
   a pair of capillary tubes containing fill fluid connected between the respective cavities of said probes and the corresponding transducer diaphragm cavities so that said transducer diaphragm will deflect in response to the differences in pressure exerted by the process fluid on the barrier diaphragms, said fill fluid on both sides of the transducer diaphragm having its volume minimized and equalized.

8. Apparatus as set forth in claim 7 in which
   the volume of the capillary tubes is equalized and minimized.

* * * * *